(12) United States Patent
Lee et al.

(10) Patent No.: US 8,416,876 B2
(45) Date of Patent: Apr. 9, 2013

(54) TRANSMITTER/RECEIVER FOR CONTROLLING MULTIUSER MULTIPLE INPUT MULTIPLE OUTPUT SYSTEM AND METHOD THEREOF

(75) Inventors: Heesoo Lee, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/664,598

(22) PCT Filed: Jun. 13, 2008

(86) PCT No.: PCT/KR2008/003358
§ 371 (c)(1),
(2), (4) Date: Dec. 22, 2009

(87) PCT Pub. No.: WO2008/153360
PCT Pub. Date: Dec. 18, 2008

(65) Prior Publication Data
US 2010/0195752 A1    Aug. 5, 2010

(30) Foreign Application Priority Data
Jun. 14, 2007    (KR) .................. 10-2007-0058373

(51) Int. Cl.
*H04B 7/02*    (2006.01)
(52) U.S. Cl. ..................................... 375/267
(58) Field of Classification Search .................. 375/267
See application file for complete search history.

(56) References Cited

U.S. PATENT DOCUMENTS

| | | | |
|---|---|---|---|
| 7,450,532 B2 * | 11/2008 | Chae et al. ............... | 370/310 |
| 2003/0128658 A1 * | 7/2003 | Walton et al. ............ | 370/208 |
| 2005/0170782 A1 * | 8/2005 | Rong et al. ............. | 455/67.11 |
| 2005/0213682 A1 * | 9/2005 | Han et al. ............... | 375/267 |
| 2007/0298728 A1 * | 12/2007 | Imamura et al. ........ | 455/77 |
| 2008/0108310 A1 * | 5/2008 | Tong et al. .............. | 455/69 |
| 2009/0044065 A1 * | 2/2009 | She et al. ................ | 714/748 |
| 2009/0252247 A1 * | 10/2009 | Lee et al. ................ | 375/267 |

FOREIGN PATENT DOCUMENTS

| | | |
|---|---|---|
| KR | 102005005343 | 6/2005 |
| KR | 10-2005-0077485 | * 6/2006 |
| KR | 10-0675205 | 1/2007 |

OTHER PUBLICATIONS

Lee, "Technology Overview", IEEE C802.20-05/72, Oct. 28, 2005.*
Lee, "ETRI proposal", IEEE C802.20-05/90, 2005.*
Lee, "Novel Multi-User MIMO Scheme Based on Successive Interference Cancellation" ISCE 2007, IEEE International Symposium on Consumer Electronics, 2007, Issue Date: Jun. 20-23, 2007, on pp. 1-5.*
Korean Office Action for Application No. 10-2008-0055849, dated May 31, 2010.

(Continued)

*Primary Examiner* — Juan A Torres
(74) *Attorney, Agent, or Firm* — Nelson Mullins Riley & Scarborough LLP; EuiHoon Lee, Esq.

(57) ABSTRACT

Provided are a method of controlling a multi-user multiple input multiple output (MIMO) system and a transmitter/receiver used in the method. In the method, it can be determined whether feedback information is fed back according to the feedback information type rather than being indiscriminately provided to a transmitter, and then only a necessary feedback information type is transmitted, thereby increasing system capacity while reducing feedback load.

22 Claims, 6 Drawing Sheets

OTHER PUBLICATIONS

Chung, Seong Taek et al., "Approaching Eigenmode BLAST Channel Capacity Using V-BLAST with Rate and Power Feedback," *IEEE VTS 54th Vehicular Technology Conference*, vol. 2:915-919 (2001).

ETRI, "Multiuser Precoding MIMO for E-UTRA Downlink," 3GPP TSG RAN WG1 Meeting #42, R1-050809, London, UK, Aug. 29-Sep. 2, 2005.

Kim, Sung Jin et al., "Space-time Technique for Wireless Multiuser MIMO Systems with SIC Receivers," *15th IEEE International Symposium on Personal, Indoor and Mobile Radio Communications*, vol. 3:2013-2017 (2004).

* cited by examiner

TRANSMITTER/RECEIVER FOR CONTROLLING MULTIUSER MULTIPLE INPUT MULTIPLE OUTPUT SYSTEM AND METHOD THEREOF

RELATED APPLICATIONS

This application is a 35 U.S.C. §371 national stage filing of PCT Application No. PCT/KR2008/003358 filed on Jun. 13, 2008, which claims priority to, and the benefit of, Korean Patent Application No. 10-2007-0058373 filed on Jun. 14, 2007 and Korean Patent Application No. 10-2008-0055849 filed on Jun. 13, 2008. The contents of the aforementioned applications are hereby incorporated by reference.

TECHNICAL FIELD

The present invention relates to a method of controlling a multi-user multiple input multiple output (MIMO) system and a transmitter and receiver used in the method, and more particularly, to a method of controlling a MIMO system that can increase a system capacity without increasing a feedback amount of channel information, and a transmitter and receiver used in the method.

The present invention is supported by the Information Technology (IT) Research & Development (R&D) program of the Ministry of Information and Communication (MIC) and the Institute for Information Technology Advancement (IITA) [2006-S-001-02, Development of Wireless Connection and Transmission is Technology for Fourth Generation Mobile Communication].

BACKGROUND ART

A multiple input multiple output (MIMO) method using multiple antennas for a transmitter and a receiver is a technology that has received much attention in wireless/mobile systems, since MIMO performance is excellent due to its improved frequency efficiency and its diversity of transmission/receipt.

Singular value decomposition (SVD) is an example of a conventional MIMO method. SVD is a method in which a transmitter uses singular value decomposition of the channel matrix that is fed back from a receiver, thereby achieving maximum performance. However, generally, in a system such as frequency division duplexing (FDD), a receiver needs to notify a transmitter of information regarding a channel matrix so that a transmitter can know the channel matrix. In this regard, since the amount of information is very large, it is difficult to use the information in an environment where a channel varies according to a period of time.

In order to overcome this problem, research has been conducted on technologies in which the performance of a transmitter can be increased by feeding back partial channel information to the transmitter. Examples of such technologies include per antenna rate control (PARC) technologies, per stream rate control (PSRC) technologies, per unitary basis stream user rate control (PU2RC) technologies, etc.

In PARC technologies, an open loop channel capacity of a MIMO channel can be obtained theoretically by feeding back only signal-to-interference-plus-noise ratio (SINR) information for each antenna while using successive interference cancellation in a receiver.

In PARC technologies, data streams are transmitted to respective antennas. On the other hand, in PSRC technologies, data streams are precoded using a unitary matrix that is fed back from a receiving terminal so as to be transmitted. In addition, the receiving terminal feeds back a unitary matrix selected from among a plurality of unitary matrixes which can be used to precode data streams in a transmitting terminal, and then the data streams are precoded to respective column vectors of the unitary matrix so as to be transmitted. The receiving terminal also feeds back an SINR for each data stream to be precoded, and the transmitting terminal determines a data transmission rate of each stream by using the fed back SINR and transmits data.

Unlike in the case of PARC and PSRC technologies improving performance between transmitting and receiving terminals using multiple antennas, PU2RC technologies improve performance by using multi-user diversity when there are a plurality of terminals using multiple antennas. In PU2RC technologies, a base station transmits a plurality of data streams. Prior to transmitting the data streams, the data streams are precoded by respective column vectors of a unitary matrix. This method is the same as PSRC technologies except that respective data streams are transmitted to different users. The SINR for each data stream is fed back from respective users. A stream is assigned to a user having an optimum SINR from among the data streams so as to improve the performance of a MIMO system.

PU2RC technologies are advantageous compared to PARC and PSRC technologies in that performance can be increased using multi-user diversity in a multi-user environment. However, PU2RC technologies are disadvantageous in that interference between data streams cannot be cancelled by using successive interference cancellation unlike in PARC or PSRC technologies.

On the other hand, PARC and PSRC technologies are advantageous compared to PU2RC technologies in that interference between data streams can be cancelled by using successive interference cancellation. However, PARC and PSRC technologies are disadvantageous in that performance cannot be increased using multi-user diversity in a multi-user environment.

Actually, comparing PU2RC technologies with PARC or PSRC technologies, performances are different according to the number of users and channel environment in a system. Generally, as the number of users is increased, and the channel environment is closed to a line of sight (LOS), the performance of PU2RC technologies is better. On the other hand, as the number of users is reduced and the channel environment is closed to a rich scattering environment, PARC or PSRC technologies are better.

In successive interference cancellation based per user stream rate control (S-PUSRC) technologies that have been newly suggested as technologies simultaneously overcoming disadvantages of PARC, PSRC and PU2RC technologies, a receiver always needs to feed back decoding order used in successive interference cancellation to a transmitter. S-PUSRC technologies are disadvantageous compared is to PARC or PU2RC technologies in that feedback load is increased.

DETAILED DESCRIPTION OF THE INVENTION

Technical Problem

Figure 1:
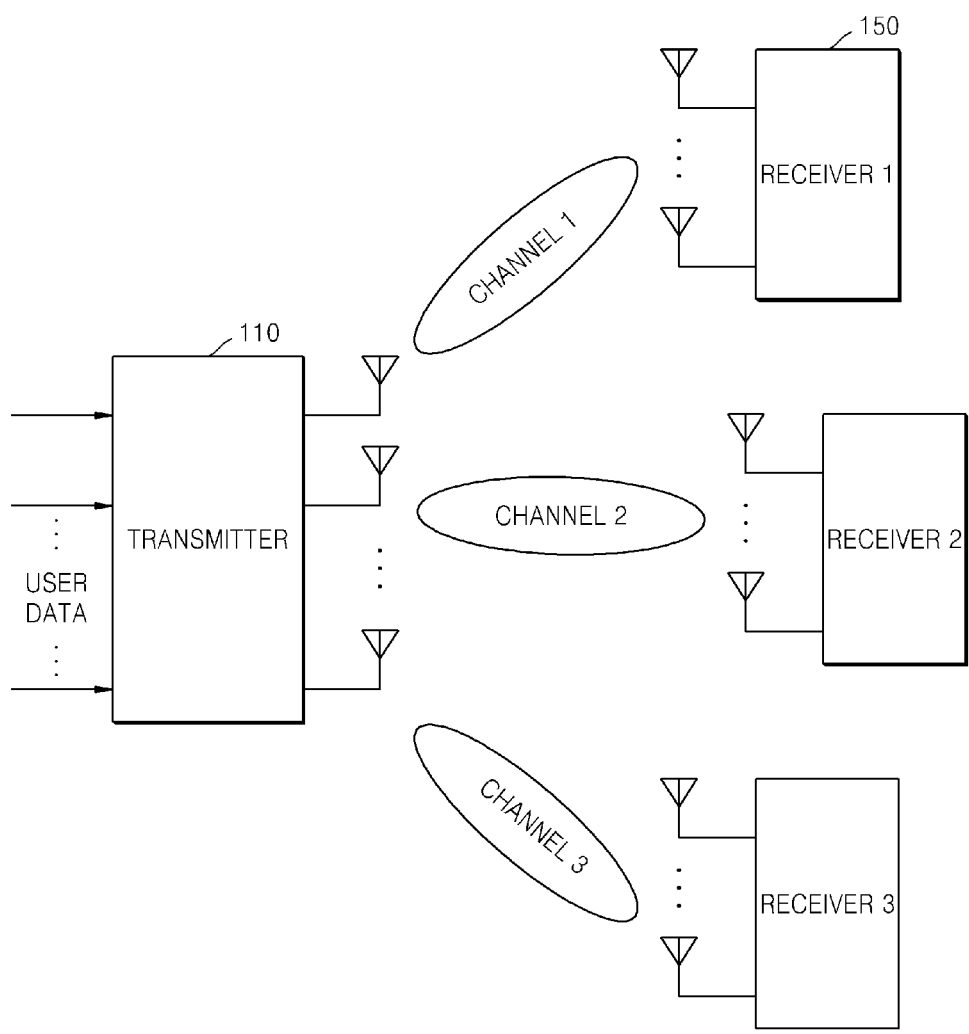
FIG. 1 is a block diagram of a multi-user multiple input multiple output (MIMO) system according to an embodiment of the present invention.

The present invention provides a method of controlling a multi-user multiple input multiple output (multi-user MIMO) system and a transmitter and receiver used in the method.

The present invention also provides a method of controlling a multi-user MIMO system, in which better performance can be achieved compared to conventional per unitary basis stream user rate control (PU2RC), per antenna rate control (PARC) and per stream rate control (PSRC) technologies by overcoming problems of the conventional technologies having varying performance according to the number of users and a channel environment, and in which feedback load can be reduced compared to successive interference cancellation based per user stream rate control (S-PUSRC), and a transmitter and receiver used in the method.

The objects and advantages of the present invention will be explained in the is following description, which includes exemplary embodiments of the present invention. In addition, it can be easily understood that the objects and advantages of the present invention can be implemented with means disclosed in the appended claims and combinations thereof.

Technical Solution

According to the present invention, it is determined whether feedback information is fed back according to the feedback information type rather than being indiscriminately provided to a transmitter, and then only a necessary feedback information type is transmitted, thereby increasing system capacity while reducing feedback load.

Advantageous Effects

According to the present invention, it is determined whether feedback information is fed back according to the feedback information type rather than being indiscriminately provided to a transmitter, and then only a necessary feedback information type is transmitted, thereby increasing system capacity while reducing feedback load.

As such, according to a method of controlling a multi-user multiple input multiple output (multi-user MIMO) system and a transmitter and receiver used in the method, better performance can be achieved compared to conventional per unitary basis stream user rate control (PU2RC), per antenna rate control (PARC) and per stream rate control (PSRC) technologies by overcoming problems of the conventional technologies.

BEST MODE

According to an aspect of the present invention, there is provided a receiver controlling a multi-user multiple input multiple output (MIMO) system, the receiver comprising a channel estimator estimating a channel with respect to a plurality of pairs of transmission/receipt antennas; a feedback unit determining whether feedback information is generated according to the estimated channel and transmitting the generated feedback information to a transmitter; and a restorer receiving a signal encoded based on the feedback information from the transmitter and restoring a plurality of data streams by applying successive interference cancellation to the received signal.

According to another aspect of the present invention, there is provided a transmitter controlling a multi-user MIMO system, the transmitter comprising a encoder assigning a plurality of pieces of user data to respective streams and encoding the pieces of user data; an adaptive transmission controller controlling streams to which the pieces of user data are assigned and data transmission rate for each stream, according to a stream decoding order fed back and an SINR for each stream, which is calculated by cancelling interference between the streams according to the stream decoding order from a receiver; and a feedback period calculator determining a feedback period of the stream decoding order and a feedback period of SINR for each stream and transmitting the two periods to the receiver.

According to another aspect of the present invention, there is provided a method of controlling a receiver of a multi-user MIMO system, the method comprising estimating a channel with respect to a plurality of pairs of transmission/receipt antennas; determining whether feedback information is generated based on the estimated channel and transmitting the generated feedback information to a transmitter; and receiving a signal encoded based on the feedback information from the transmitter and restoring a plurality of data streams by applying successive interference cancellation to the received signal.

According to another aspect of the present invention, there is provided a method of controlling a transmitter of a multi-user system, the method comprising receiving feedback information regarding a stream decoding order and SINR for each streams, which is calculated by cancelling interference between the streams according to the stream decoding order, from a receiver; assigning a plurality of pieces of user data to respective streams according to a control signal generated based on the feedback information; encoding and transmitting the streams at a data transmission rate according to the control signal; and determining a feedback period of the stream decoding order and a feedback period of SINR for each stream and transmitting the two periods to the receiver.

According to another aspect of the present invention, there is provided a method of controlling a multi-user MIMO system comprising a transmitter having multiple antennas and a receiver having multiple antennas, the method comprising (a) estimating a MIMO channel, wherein the estimating is performed by the receiver; (b) determining whether a stream decoding order is fed back for optimum successive interference cancellation and feeding back the stream decoding order calculated based on the estimated channel when the stream decoding order is required to be fed back, wherein the determining is performed in the receiver; (c) determining whether an SINR for each stream is fed back, and feeding back the SINR for each stream, which is calculated by cancelling interference between streams based on the estimated channel when the SINR for each stream is required to be fed back, wherein the determining is performed in the receiver: and (d) determining a data transmission rate for each stream and a stream to be assigned to the receiver from among a plurality of streams by using feedback information regarding the SINR for each stream.

According to another aspect of the present invention, there is provided a computer readable recording medium having recorded thereon a program for executing a method of controlling a multi-user MIMO system, a transmitter and receiver.

MODE OF THE INVENTION

Hereinafter, the present invention will be described more fully with reference to the accompanying drawings, in which exemplary embodiments of the invention are shown. In the drawings, like reference numerals denote like elements. Also, while describing the present invention, detailed descriptions about related well-known functions or configurations that may diminish the clarity of the points of the present invention are omitted.

When an element is "included", it means that other elements may be further included, instead of excluding other elements unless there is any specific contrary description.

As described in the background art, in per unitary basis stream user rate control (PU2RC) technologies, appropriate streams are assigned to respective users in a multi-user multiple input multiple output (MIMO) environment. Each stream is multiplied by precode vectors corresponding to the stream so as to be transmitted via multiple antennas. In PU2RC technologies, streams are respectively precoded by unitary vectors, and then assigned to respective users, thereby improving the performance of a system by using multi-user diversity. However, PU2RC technologies are disadvantageous compared to per antenna rate control (PARC) or per stream rate control (PSRC) technologies in that interference between streams cannot be cancelled.

In the meantime, in successive interference cancellation based per user stream rate control (S-PUSRC) technologies, multi-user diversity can be achieved by overcoming the problems of the above-described technologies and a successive interference cancellation gain is achieved by cancelling interference between streams. However, S-PUSRC technologies have a problem with large feedback load compared to the above-described technologies.

In a method according to the present invention, the problems of S-PUSRC having large feedback load can be overcome while retaining all advantages of the above-described technologies.

FIG. 1 is a block diagram of a multi-user MIMO system according to an embodiment of the present invention.

Referring to FIG. 1, the multi-user MIMO system according to the current embodiment of the present invention includes a transmitter 110 including multiple antennas and a plurality of receivers (i.e., receivers 1 through 3) each of which includes multiple antennas. Hereinafter, the multi-user MIMO system of the current embodiment will be described in terms of the receiver 1 (hereinafter, referred to as a receiver 150), which can also be applied to the receivers 2 and 3.

The transmitter 110 determines a stream to be assigned to the receiver 150 from among a plurality of streams, according to feedback information (decoding order and signal-to-interference-plus-noise ratio (SINR) information for each stream), which is input from the receiver 150, and determines a data transmission rate for each stream. In addition, the transmitter 110 calculates a feedback period of the decoding order and a feedback period of the SINR for each stream, to which successive inference cancellation is applied, and notifies the receiver 150 of the two periods.

User data is transmitted to the receiver 150 by using a stream assigned to a user from among a plurality of streams transmitted from the transmitter 110.

The receiver 150 determines whether an order of successive inference cancellation (decoding order) is fed back and whether SINR for each stream, to which the successive inference cancellation is applied, is fed back. When it is determined that the decoding order and the SINR are required to be fed back, the decoding order and the SINR are calculated and are fed back to the transmitter 110.

Figure 2:
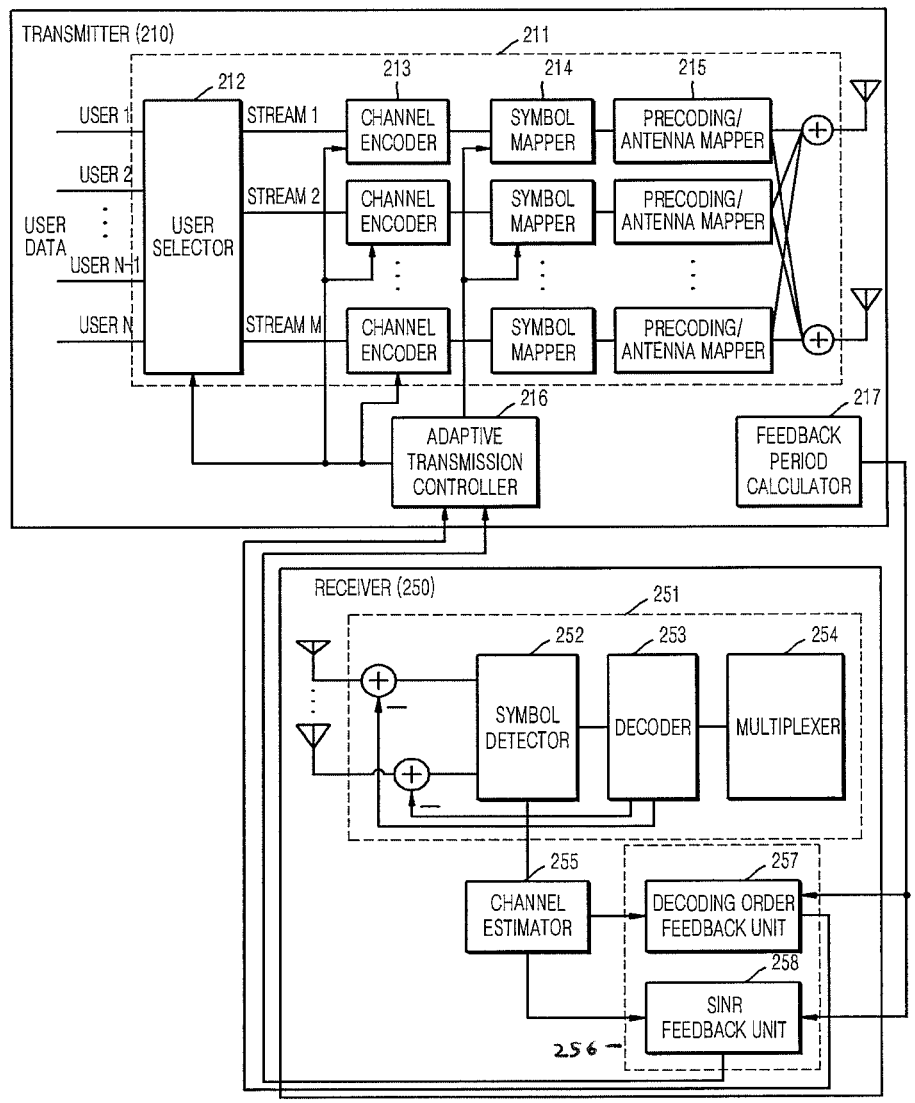
FIG. 2 is a detailed block diagram of a multi-user MIMO system according to another embodiment of the present invention.

FIG. 2 is a detailed block diagram of a multi-user MIMO system according to another embodiment of the present invention.

Referring to FIG. 2, the multi-user MIMO system according to the current embodiment of the present invention includes a transmitter 210 and a receiver 250.

The transmitter 210 includes an encoder 211, an adaptive transmission controller 216 and a feedback period calculator 217.

The encoder 211 assigns a plurality of pieces of user data to respective streams and encodes the plurality of pieces of user data. The encoder 211 includes a user selector 212, a plurality of channel encoders 213, a plurality of symbol mappers 214 and a plurality of precoding/antenna mappers 215.

The user selector 212 assigns the plurality of pieces of user data to the respective streams, according to a control signal of the adaptive transmission controller 216. For example, when the number of antennas in a base station (a transmitter) is four, and the number of users (receivers) is three, a stream 1 is assigned to a user 1, and streams 2 and 3 are assigned to a user 2, and a stream 4 is assigned to a user 3. Like in the case of the user 2, when a plurality of streams are assigned to a single user, the user selector 212 divides data of the user 2 into two pieces of low speed parallel data and assigns the two pieces of low speed parallel data to the respective streams. That is, one piece of low speed parallel data is assigned to the stream 2 and the other piece of low speed parallel data is assigned to the stream 3.

The channel encoder 213 encodes the streams. The symbol mapper 214 maps the encoded streams to symbols. The precoding/antenna mapper 215 multiplies the streams by precoding vectors corresponding to the respective streams so as to transmit the streams to a transmitting antenna, or alternatively, the precoding/antenna mapper 215 simply performs antenna-mapping the streams so as to transmit the streams to an antenna. The precoding vectors corresponding to the respective streams may each be a fixed predetermined vector, or alternatively, may be changed by a request of the adaptive transmission controller 216 according to a precoding vector fed back from the receiver 250.

The adaptive transmission controller 216 determines how the streams are transmitted using feedback information regarding the decoding order and the SINR, which is received from the receiver 250, and then controls the encoder 211 according to a determination result. That is, the adaptive transmission controller 216 receives feedback information regarding the decoding order and the SINR for each stream depending on the decoding order from the receiver 250, and determines streams to which each of the plurality of pieces of user data is assigned and data transmission rate of the respective streams, according to the feedback information.

The feedback period calculator 217 may be optionally included in the multi-user MIMO system, and may determine a feedback period of the decoding order of the streams and a feedback period of the SINR of each stream, and transmits the two periods to the receiver 250.

The receiver 250 includes a restorer 251, a channel estimator 255 and a feedback unit 256.

The restorer 251 restores a signal received from the transmitter 210 to a plurality of streams by applying successive interference cancellation. The received signal is a signal encoded according to the feedback information that is previously transmitted by the receiver 250 to the transmitter 210. Also, the restorer 251 restores the received signal by applying successive interference cancellation, according to the feedback information. The restorer 251 includes a symbol detector 252, a decoder 253 and a multiplexer 254.

The symbol detector 252 detects a vector signal received via an antenna in a predetermined order. That is, the symbol detector 252 detects symbols of the received signal by applying successive interference cancellation, according to the decoding order of the feedback information. The decoder 253 decodes and restores the detected symbol to a plurality of data streams. The multiplexer 254 multiplexes the plurality of restored data streams. For example, when general successive inference cancellation is used, the decoder 253 restores a signal, which is first detected, to original information. The restored signal is encoded to a signal transmitted from an original transmitting terminal. Then, the encoded signal is multiplied by a corresponding channel and is deduced from the received signal. Thus, the signal that is first detected does not affect other remaining streams. According to the present invention, it is assumed that such successive inference cancellation is used in the receiver 250.

The channel estimator 255 estimates a MIMO channel with respect to a plurality of pairs of transmission/receipt antennas by using a pilot symbol. The estimated channels are input to the symbol detector 252 so as to be used to detect the respective streams.

The feedback unit 256 determines whether feedback information is generated, according to a matrix of the channels estimated by the channel estimator 255, and transmits the generated feedback information to the adaptive transmission controller 216 of the transmitter 210. The feedback unit 256 includes a decoding order feedback unit 257 and an SINR feedback unit 258.

The decoding order feedback unit 257 determines whether a new decoding order is required to be fed back. When the new decoding order is required to be fed back, the decoding order feedback unit 257 calculates an optimum decoding order and feeds back the optimum decoding order to the transmitter 210. The SINR feedback unit 258 determines whether SINRs for each respective stream, to which successive interference cancellation is applied, are required to be fed back. When the SINRs are required to be fed back, the SINR feedback unit 258 feeds back the SINRs to the transmitter 210. Determining whether the optimum decoding order feed back is fed back and determining whether the SINR is fed back are independently performed. That is, even if the decoding order is not fed back, the SINR may be fed back. When the optimum decoding order and the SINR for each stream are simultaneously fed back, the SINR feedback unit 258 feeds back the SINR for each stream, to which successive interference cancellation is applied, according to the optimum decoding order. When it is determined that the decoding order is not fed back and only the SINR is fed back, the SINR feedback unit 258 feeds back the SINR for each stream, to which successive interference cancellation is applied, according to a decoding order that has previously been fed back.

The transmitter 210 and the receiver 250 feed back the SINR, to which an order of successive inference cancellation (the decoding order) and successive inference cancellation are applied. On the other hand, in per unitary basis stream user rate control (PU2RC), a decoding order is not fed back. In addition, SINR, to which successive inference cancellation is not applied, is fed back.

For example, the optimum decoding order may be calculated as follows. However, the present invention is not limited thereto.

First, SINRs for respective streams are calculated using estimated channel coefficients. A stream having the greatest SINR is determined as a first decoding stream. Interference due to the first decoding stream is cancelled in a received signal, and then SINRs for other remaining streams are newly calculated. Then, a stream having the greatest SINR from among the SINRs for other remaining streams is determined as a second decoding stream. The process is repeated up to the last stream, and thus the optimum decoding order can be determined.

In the decoding order feedback unit 257 and the SINR feedback unit 258, it is determined whether the decoding order and the SINR are fed back as follows. However, the present invention is not limited to the following algorithm.

Figure 3:
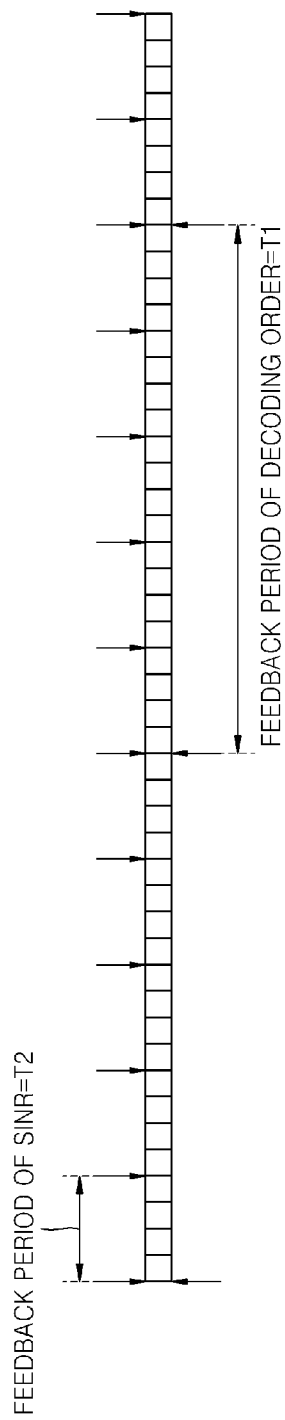
FIG. 3 illustrates a feedback period of a decoding order and a feedback period of a signal-to-interference-plus-noise ratio (SINR), according to an embodiment of the present invention.

The optimum decoding order is fed back for every predetermined period T1, and SINR for each stream is fed back for every predetermined period T2. T1 and T2 may be the same or different from each other. FIG. 3 illustrates the case where an SINR feedback period, i.e., T2 is 4 time slots and an optimum decoding order feedback period, i.e., T1 is 20 time slots. In FIG. 2, the decoding order feedback unit 257 operates a timer for every hour so that the optimum decoding order is fed back to the transmitter 210 for every 20 time slots.

The feedback periods T1 and T2 may be determined by the transmitter 210 or the receiver 250. When the transmitter 210 determines the feedback periods T1 and T2, the transmitter 210 determines load of a feed back channel, according to the number of users in the MIMO system and a speed of channel change of the user. The feedback period calculator 217 of the transmitter 210 calculates the feedback periods T1 and T2 and then notifies the receiver 250 of the feedback periods T1 and T2. When the receiver 250 determines the feedback periods T1 and T2, the receiver 250 determines the feedback periods T1 and T2 according to the speed channel change of the user, and notifies the transmitter 210 of the feedback periods T1 and T2.

Unlike in the above-described method, the receiver 250 calculates the difference between performances of two cases, wherein a first case is the case where the optimum decoding order is used and a second case is the case where a decoding order that is previously fed back is used. When the difference is equal to or greater than a predetermined threshold value, the optimum decoding order and the SINR for each stream depending on the optimum decoding order are newly notified to the transmitter 210. When the difference is smaller than the threshold value, the optimum decoding order may not be notified to the transmitter 210. In addition, the receiver 250 calculates the difference between performances of two cases, wherein a first case is the case where a current SINR is used and a second case is the case where a SINR that is previously fed back is used. When the difference is equal to or greater than a predetermined threshold value, a new SINR for each stream is notified to the transmitter 210. When the difference is smaller than the threshold value, the new SINR may not be notified to the transmitter 210.

T1 and T2 as optimum feedback periods are determined by the transmitter 110, according to the number of users in the MIMO system and the speed of channel change of users, and are notified to the receiver 150. The receiver 150 may feedback the optimum successive interference cancellation based decoding order and the SINR for each stream, to which successive interference cancellation are applied.

Alternatively, the receiver 150 may determine the optimum feedback periods T1 and T2, according to the speed of channel change of user, and may notify the transmitter 110 of the optimum feedback periods T1 and T2. The receiver 150 may feedback the optimum successive interference cancellation based decoding order and the SINR for each stream, to which successive interference cancellation are applied.

Figure 4:
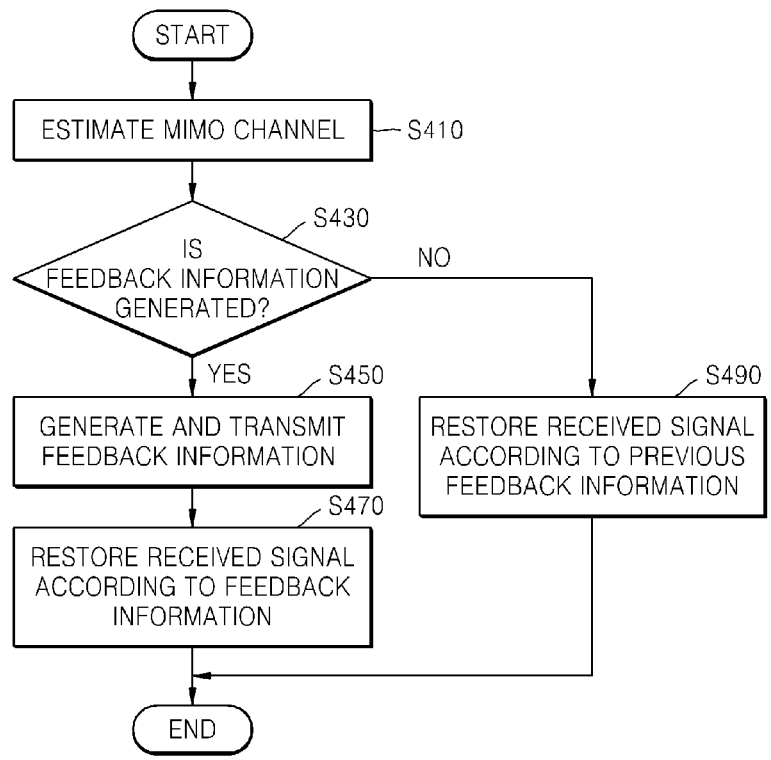
FIG. 4 is a flowchart showing a method of controlling a receiver of a multi-user MIMO system, according to an embodiment of the present invention.

FIG. 4 is a flowchart showing a method of controlling a receiver of a multi-user MIMO system, according to an embodiment of the present invention. The same description as in FIGS. 1 through 3 will not be repeated.

Referring to FIG. 4, the receiver estimates a MIMO channel with respect to a plurality of receiving antennas by using a pilot symbol (operation S410).

The receiver determines whether feedback information is generated, according to the estimated MIMO channel (operation S430). If necessary, the generated feedback information is transmitted to a transmitter (operation S450). The receiver independently determines whether a SINR of a stream, in which interference is cancelled, according to a predetermined decoding order and whether a decoding order of streams are fed back. A feedback period of the decoding order and a feedback period of the SINR may be differently determined. The feedback period of the decoding order may be determined so as to be greater than the feedback period of the SINR.

At least one stream decoded according to the feedback information is received from the transmitter, and the stream is restored applying successive interference cancellation technique (operation S470). When the new feedback information is not generated, the stream is restored according to the feedback information that is previously transmitted (operation S490).

Figure 5:
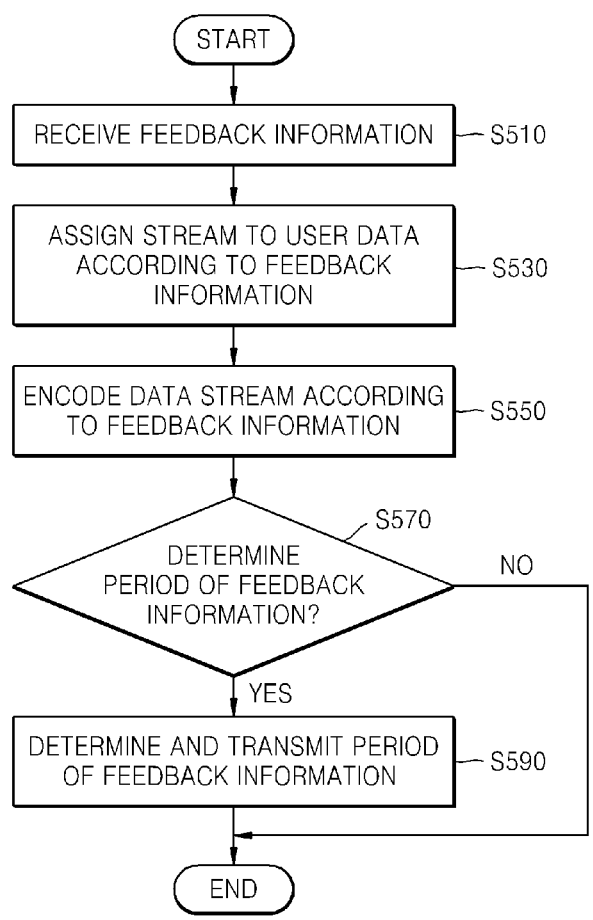
FIG. 5 is a flowchart showing a method of controlling a transmitter of a multi-user MIMO system, according to an embodiment of the present invention.

FIG. 5 is a flowchart showing a method of controlling a transmitter of a multi-user MIMO system, according to an embodiment of the present invention. The same description as in FIGS. 1 through 4 will not be repeated.

Referring to FIG. 5, the transmitter receives feedback information including a decoding order of data streams and an SINR for each stream from a receiver (operation S510).

The transmitter assigns a plurality of pieces of user data to respective streams, according to a control signal generated based on the received feedback information (operation S530).

The transmitter encodes and transmits the assigned streams to the receiver at a data transmission rate according to the control signal generated based on the feedback information (operation S550).

The transmitter determines whether a feedback period of the decoding order of streams and a feedback period of the SINR for each stream depending on the decoding order are required to be determined (operation S570). If necessary, the feedback period of the decoding order of streams and the feedback period of the SINR for each stream depending on the decoding order are transmitted to the receiver (operation S590).

Figure 6:
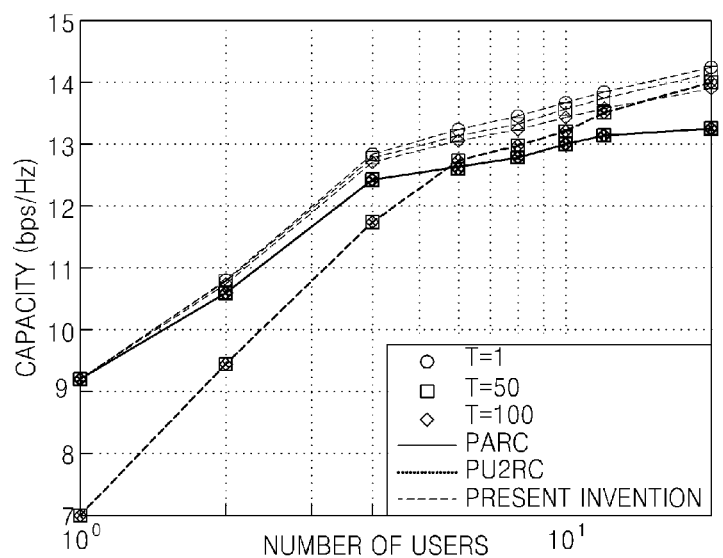
FIGS. 6 and 7 are graphs for comparison of performance between a conventional MIMO system and a MIMO system for which feedback information is periodically provided, according to an embodiment of the present invention.
Figure 7:
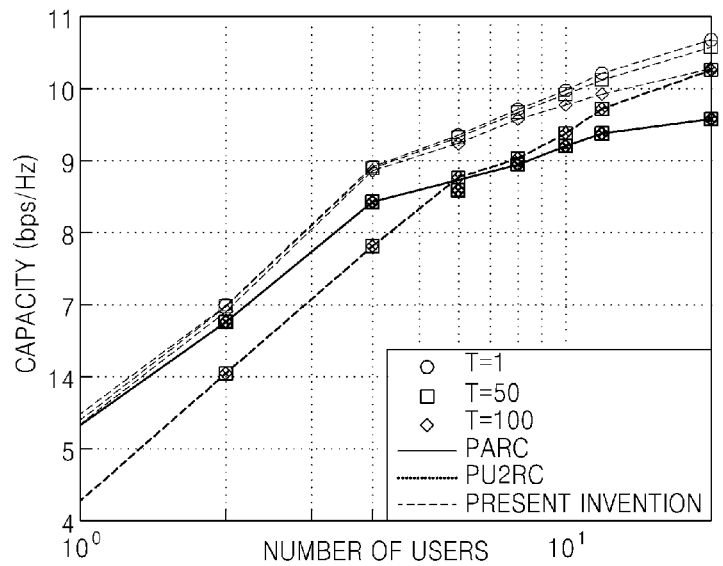

FIGS. 6 and 7 are graphs for comparison of performance between a conventional MIMO system and a MIMO system for which feedback information is periodically provided, according to an embodiment of the present invention.

In FIGS. 6 and 7, transmission data rates are respectively inferred according to is a theoretical channel capacity formula and a real adaptive modulation and coding (AMC) table. T is a feedback period of a decoding order, and a feedback period of SINR is set to 1.

Referring to FIGS. 6 and 7, it can be seen that the system capacity of the present embodiment is greater regardless of the number of users and the amount of feedback can be considerably reduced without performance difference in the range of T=1 to T=100.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

The present invention has been described in greater detail with reference to the exemplary embodiments. The terms used to describe the present invention are for descriptive purposes only and are not intended to limit the scope of the invention.

While this invention has been particularly shown and described with reference to preferred embodiments thereof, it will be understood by one skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A receiver controlling a multi-user multiple input multiple output (MIMO) system, the receiver comprising:
   a channel estimator estimating a channel with respect to a plurality of pairs of transmission/receipt antennas;
   a feedback unit determining whether feedback information is generated based on the estimated channel and transmitting the generated feedback information to a transmitter, the feedback unit further including:
      a decoding order feedback unit determining whether a decoding order of the data streams is fed back, and calculating and feeding back an optimum decoding order; and
      a signal-to-interference-plus-noise ratio (SINR) feedback unit determining whether an SINR for each stream is fed back, calculating the SINR for each stream by cancelling interference between streams according to a predetermined decoding order, and feeding back the SINR for each stream; and
   a restorer receiving a signal encoded based on the feedback information from the transmitter and restoring a plurality of data streams by applying successive interference cancellation to the received signal.

2. The receiver of claim wherein, when the decoding order and the SINR are simultaneously fed back, the optimum decoding order and the SINR for each stream, which is calculated by cancelling interference between streams according to the optimum decoding order, are fed back.

3. The receiver of claim 1, wherein, when only the SINR is fed back, an SINR for each stream, which is calculated by cancelling interference between streams according to a decoding order that has previously been fed back.

4. The receiver of claim 1, wherein, when a difference of performance between the optimum decoding order and a decoding order that has previously been fed back is equal to or greater than a predetermined threshold value, the optimum decoding order and the SINR for each stream, which is calculated by cancelling interference between streams according to the optimum decoding order, are fed back.

5. The receiver of claim 1, wherein, when a difference of performance between a newly-calculated SINR and an SINR which has previously been fed back, is equal to or greater than a predetermined threshold value, the newly-calculated SINR is fed back.

6. The receiver of claim 1, wherein the restorer comprises:
a symbol detector detecting symbols of the received signal by applying successive inference cancellation, based on feedback information regarding the decoding order;
a decoder decoding the detected symbols and restoring the detected symbols to a plurality of data streams; and
a multiplexer multiplexing the plurality of streams.

7. A transmitter controlling a multi-user multiple input multiple output (MIMO) system, the transmitter comprising:
a encoder assigning a plurality of pieces of user data to respective streams and encoding the pieces of user data;
an adaptive transmission controller controlling streams to which the pieces of user data are assigned and data transmission rate for each stream, according to a stream decoding order fed back and a signal-to-interference-plus-noise ratio (SINR) for each stream, which is calculated by cancelling interference between the streams according to the stream decoding order from a receiver; and
a feedback period calculator determining a feedback period of the stream decoding order and a feedback period of SINR for each stream and transmitting the two periods to the receiver.

8. The transmitter of claim 7, wherein the encoder comprises:
a user selector assigning a plurality of pieces of user data to respective streams according to a control signal received from the adaptive transmission controller and outputting the streams;
a plurality of channel encoders encoding the output data streams;
a plurality of symbol mappers mapping the encoded streams to symbols; and
a precoding/antenna mapper precoding or antenna-mapping the symbols so as to transmit the symbols to a transmission antenna.

9. A method of controlling a receiver of a multi-user multiple input multiple output (MIMO) system, the method comprising:
estimating a channel with respect to a plurality of pairs of transmission/receipt antennas;
determining whether feedback information is generated based on the estimated channel and transmitting the generated feedback information to a transmitter, the determining:
determining whether a decoding order of the data streams is fed back, and calculating and feeding back an optimum decoding order; and
determining whether a signal-to-interference-plus-noise ratio (SINR) is fed back, calculating SINR for each stream by cancelling interference between streams according to a predetermined decoding order, and feeding back the SINR for each stream; and
receiving a signal encoded based on the feedback information from the transmitter and restoring a plurality of data streams by applying successive interference cancellation to the received signal.

10. The method of claim 9, wherein the determining whether the decoding order is fed back and determining whether the SINR is fed back are independently performed.

11. The method of claim 9, wherein, when the decoding order and the SINR are simultaneously fed back, the optimum decoding order and the SINR for each stream, which is calculated by cancelling interference between streams according to the optimum decoding order, are fed back.

12. The method of claim 9, wherein, when only the SINR is fed back, an SINR for each stream, which is calculated by cancelling interference between streams according to a decoding order that has previously been fed back.

13. The method of claim 9, wherein a feedback period of the decoding order and a feedback period of SINR are different from each other.

14. The method of claim 9, wherein a feedback period of the decoding order is greater than a feedback period of SINR.

15. The method of claim 9, wherein a feedback period of the decoding order and a feedback period of SINR are determined by a transmitter.

16. The method of claim 9, wherein a feedback period of the decoding order and a feedback period of SINR are determined by a receiver.

17. The method of claim 9, wherein, when a difference of performance between the optimum decoding order and a decoding order that has previously been fed back is equal to or greater than a predetermined threshold value, the optimum decoding order and the SINR for each stream, which is calculated by cancelling interference between streams according to the optimum decoding order, are fed back.

18. The method of claim 9, wherein, when a difference of performances between a newly-calculated SINR and an SINR which has previously been fed back is equal to or greater than a predetermined threshold value, the newly-calculated SINR is fed back.

19. The method of claim 9, wherein the restoring comprises:
detecting symbols of the received signal by applying successive inference cancellation, based on feedback information regarding the decoding order;
decoding the detected symbols and restoring the detected symbols to a plurality of data streams; and
multiplexing the plurality of restored data streams.

20. A method of controlling a transmitter of a multi-user system, the method comprising:
receiving feedback information regarding a stream decoding order and signal-to-interference-plus-noise ratio (SINR) for each, which is calculated by cancelling interference between the streams according to the stream decoding order, from a receiver;
assigning a plurality of pieces of user data to respective streams according to a control signal generated based on the feedback information;
encoding and transmitting the streams at a data transmission rate according to the control signal; and
determining a feedback period of the stream decoding order and a feedback period of SINR for each stream and transmitting the two periods to the receiver.

21. The method of claim 20, wherein the encoding and transmitting comprises:
assigning a plurality of pieces of user data to respective streams according to the control signal and outputting the streams;
encoding the output data streams;
mapping the encoded streams to symbols; and
precoding or antenna-mapping the symbols so as to transmit the symbols to a transmission antenna.

22. A method of controlling a multi-user multiple input multiple output (MIMO) system comprising a transmitter having multiple antennas and a receiver having multiple antennas, the method comprising:
  (a) estimating a MIMO channel, wherein the estimating is performed by the receiver;
  (b) determining whether a stream decoding order is fed back for optimum successive interference cancellation and feeding back the stream decoding order calculated based on the estimated channel when the stream decoding order is required to be fed back, wherein the determining is performed in the receiver;
  (c) determining whether a signal-to-interference-plus-noise ratio (SINR) for each stream is fed back, and feeding back the SINR for each stream, which is calculated by cancelling interference between streams based on the estimated channel when the SINR for each stream is required to be fed back, wherein the determining is performed in the receiver: and
  (d) determining a data transmission rate for each stream and a stream to be assigned to the receiver from among a plurality of streams by using feedback information.

* * * * *